April 6, 1965 — R. C. SCHWARTZ — 3,176,595

PLASTIC PISTON ASSEMBLY

Filed May 22, 1963

INVENTOR
ROY C. SCHWARTZ 3,176,595
PLASTIC PISTON ASSEMBLY
Roy C. Schwartz, Brookfield, Wis., assignor to Galland-Henning Manufacturing Company, Milwaukee, Wis., a corporation of Wisconsin
Filed May 22, 1963, Ser. No. 282,311
1 Claim. (Cl. 92—243)

This invention appertains to pistons of the type particularly useful in cylinder assemblies handling air or other fluid for actuating machine parts.

One of the primary objects of this invention is to provide a single piece integrally molded piston having a central solid hub or body and flexible annular end ring portions for intimate sealing contact with the wall of a cylinder during the reciprocation of the piston in the cylinder.

Another salient object of the invention is to provide the end flexible ring portions extending angularly outward from the hub or body to insure the proper sealing contact with the wall of a cylinder.

A further prime object of the invention is to provide the hub with V-shaped annular grooves at its terminals disposed axially inward of the flexible ring portions to increase the resiliency thereof and to form internal pockets or cups for receiving compression during the power stroke of the piston and thus further flex the ring portions outward for cylinder engagement.

A still further object of the invention is to provide a plastic piston molded directly on its piston rod, the rod being provided with a terminal anchor head or flange located equidistantly of the ends of the piston and between the flexible ring portions, the anchor head or flanges functioning to insure the proper rigid and firm connection of the piston with the rod and to reinforce the hub or body portion of the piston.

A still further important object of the invention is to provide an integral plastic piston of a simple and durable construction and one which can be molded and placed upon the market at a low cost.

Another still further object of the invention is to provide an integral molded piston which will effectively eliminate machining and the use of extraneous piston rings or cups.

With these and other objects in view, the invention consists in the novel construction, arrangement and formation of parts, as will be hereinafter more specifically described and claimed and illustrated in the accompanying drawing, in which drawing, FIGURE 1 is a side elevational view of the novel piston molded on a piston rod;

Referring to the drawing in detail, wherein similar reference characters designate corresponding parts throughout the several views, the letter P generally indicates the improved piston molded on a piston rod R.

The piston P is molded in one piece to form a unitary structure and from a desired type of material such as a thermoplastic. One example of the thermoplastic can be polyurethane.

Figure 1:
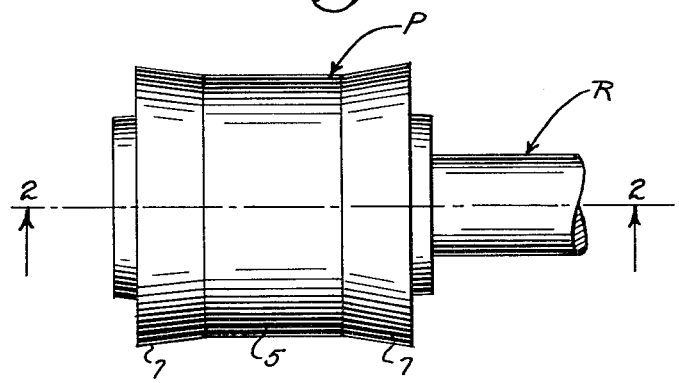
Figure 2:
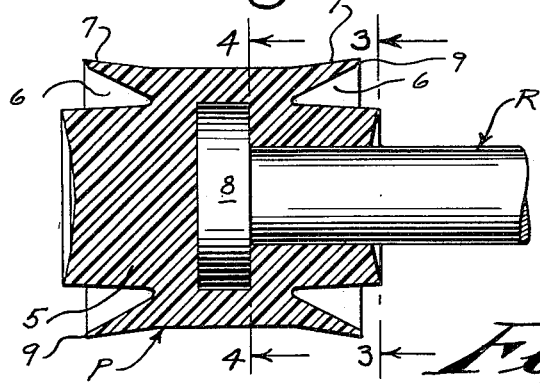
FIGURE 2 is a central longitudinal sectional view through the piston, the rod being shown in side elevation, the section being taken on the line 2—2 of FIGURE 1, looking in the direction of the arrows.
Figure 4:
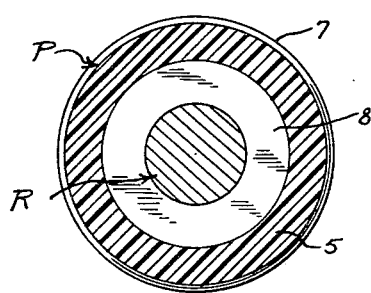
FIGURE 4 is a transverse sectional view through the piston and rod taken on the line 4—4 of FIGURE 2, looking in the direction of the arrows.
Figure 3:
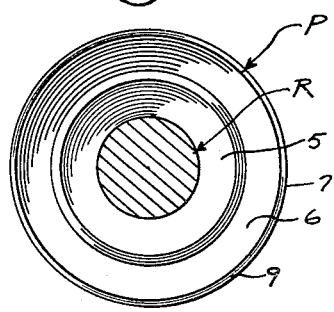
FIGURE 3 is a transverse sectional view through the piston rod taken on the line 3—3 of FIGURE 2, looking in the direction of the arrows and showing one end of the piston in elevation.

The piston P includes a substantially rigid or solid hub portion or body 5. This body, at its terminals has molded therein annular grooves 6 of a substantially V-shape in cross-section. These grooves extend inwardly from the end faces of the hub or body but terminate short of the transverse center of the body. The grooves 6 define internal pockets or chambers, for a purpose, which will be later set forth. By molding the grooves 6, flexible annular end flanges 7 are formed. These flanges in effect define rings or cups for intimate engagement with the wall of a cylinder. During the molding of the piston the flanges, rings or cups 7, are flared angularly outwardly from the hub to increase the flexibility thereof and to insure the proper sealing engagement of the flanges with the wall of a cylinder. In actual practice, the diameter of the flanges, rings or cups is greater than the internal diameter of a cylinder with which the piston is associated and hence, the flexible flanges, rings or cups 7 are normally flexed inwardly, when the piston is in its operative position. Here again this insures the proper sealing engagement of the flanges with a cylinder wall. As best shown in FIGURE 2, the terminals of the body portion or hub of the piston extend slightly beyond the flexible flanges, rings or cups.

The piston rod R at its terminal is provided with an annular anchor head or flange 8. As heretofore brought out, the piston is molded directly on its rod and the plastic material flows around the head or flange 8 during the forming of the piston. Thus, the piston is firmly anchored to its rod R. Particular attention is directed to the fact that the anchor head or flange 8 is located centrally of the piston and equidistantly of its ends and inward of the grooves 6. Thus, this anchor head or flange also functions as means to reinforce the solid body or hub portion of the piston.

The pockets or chambers defined by the grooves 6 not only bring about the forming of the flexible resilient flanges 7, but also form compression chambers. Thus on the working stroke of the piston fluid under pressure enters a chamber and this pressure tends to outwardly flex the adjacent flange and move and hold such flange into its intimate sealing contact with the cylinder wall. It is to be also noted that the flexible resilient flanges 7 terminate in a substantially feathered edge 9, for wiping contact with the cylinder wall.

From the foregoing description, it can be seen that an effective one-piece piston has been provided which will properly engage a cylinder wall at all times.

In view of the fact that the piston can be molded at such a low cost, the same can be discarded when wear takes place thereon. This eliminates the refinishing of a piston and the replacing of rings, cups and the like. As the flexible resilient flanges 7 normally flare outwardly, the piston in effect, is pre-loaded, and of course, the flanges, cups or rings expand outward under pressure.

Changes in details may be made without departing from the spirit or the scope of this invention, but what I claim as new is:

A piston assembly comprising a piston rod having an outwardly projecting terminal anchor head and a one-piece piston molded around said rod and head, said piston including a solid body and outwardly flared annular flexible and resilient flanges, the terminals of said body also having inwardly extending annular grooves terminating short of the transverse center of said body, and said grooves being of a substantially V-shape in cross-section and cooperating with said flanges to define compression chambers, the outer end termination of said annular flanges having a feathered edge, said anchor head being located centrally of the body and equidistantly of the ends of the body and inward of said grooves to define a reinforcement for said body.

References Cited by the Examiner

UNITED STATES PATENTS

| 1,195,546 | 8/16 | Wrightson | 92—248 |
| 3,094,904 | 6/63 | Healy | 92—243 |

FOREIGN PATENTS

| 887,053 | 1/62 | Great Britain. |

RICHARD B. WILKINSON, *Primary Examiner.*

KARL J. ALBRECHT, *Examiner.*